US012695332B2

(12) United States Patent
Lee et al.

(10) Patent No.: US 12,695,332 B2
(45) Date of Patent: Jul. 28, 2026

(54) WIRELESS POWER TRANSMITTING MODULE INCLUDING ACCOMMODATING PORTION AND AUXILIARY SHIELDING SHEET

(71) Applicant: AMOSENSE CO., LTD, Cheonan-si (KR)

(72) Inventors: Jung Wook Lee, Cheonan-si (KR); Bo Hyeon Han, Cheonan-si (KR); Won San Na, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 677 days.

(21) Appl. No.: 18/251,175

(22) PCT Filed: Oct. 28, 2021

(86) PCT No.: PCT/KR2021/015311
§ 371 (c)(1),
(2) Date: Apr. 28, 2023

(87) PCT Pub. No.: WO2022/092856
PCT Pub. Date: May 5, 2022

(65) Prior Publication Data
US 2024/0006929 A1     Jan. 4, 2024

(30) Foreign Application Priority Data
Nov. 2, 2020    (KR) ........................ 10-2020-0144122

(51) Int. Cl.
*H01M 10/46*     (2006.01)
*H02J 7/70*     (2026.01)
(Continued)

(52) U.S. Cl.
CPC ................ *H02J 50/70* (2016.02); *H02J 7/70* (2026.01); *H02J 50/005* (2020.01); *H02J 50/10* (2016.02); *H02J 50/402* (2020.01)

(58) Field of Classification Search
CPC .......... H02J 7/70; H02J 7/0042; H02J 50/005; H02J 50/10; H02J 60/70; H02J 50/402; H01F 27/36; H01F 38/14; H05K 9/0081
(Continued)

(56) References Cited

U.S. PATENT DOCUMENTS 9,805,862 B2 * 10/2017 Kozakai ................... H04B 5/79
2009/0096413 A1    4/2009 Partovi et al.
2020/0412175 A1 * 12/2020 Han ...................... H01F 27/366

FOREIGN PATENT DOCUMENTS

CN     111527666 A     8/2020
CN     111819761 A   *   10/2020    .............. H02J 50/10
(Continued)

OTHER PUBLICATIONS

Machine translation of WO2019172595A1 (Sep. 12, 2019) (Year: 2019).*
(Continued)

*Primary Examiner* — Edward Tso
(74) *Attorney, Agent, or Firm* — BROADVIEW IP LAW, PC

(57) ABSTRACT

Disclosed is a wireless power transmitting module comprising: a coil unit provided with a coil body in which a conductive member having a predetermined length is wound in one direction, and with a planar coil including a pair of terminal portions extending from the coil body by a predetermined length for electrical connection; a main shielding sheet arranged on one surface of the coil unit to shield a magnetic field generated from the coil unit; an accommodating portion formed through the main shielding sheet so as (Continued)

100 to accommodate the thickness of at least one of the pair of terminal portions; and an auxiliary shielding sheet attached to one surface of the main shielding sheet so as to cover the accommodating portion in order to shield a magnetic field leaking through the accommodating portion, wherein the auxiliary shielding sheet has a relatively thinner thickness than the main shielding sheet.

10 Claims, 10 Drawing Sheets

(51) Int. Cl.
| | | |
|---|---|---|
| *H02J 50/00* | (2016.01) | |
| *H02J 50/10* | (2016.01) | |
| *H02J 50/40* | (2016.01) | |
| *H02J 50/70* | (2016.01) | |

(58) Field of Classification Search
USPC .......................... 320/107, 108, 114, 115, 138
See application file for complete search history.

(56) References Cited

FOREIGN PATENT DOCUMENTS

| | | | | | |
|---|---|---|---|---|---|
| KR | 10-2013-0130366 | A | 12/2013 | | |
| KR | 20170072627 | A | 6/2017 | | |
| KR | 20180084307 | A | 7/2018 | | |
| KR | 10-2019-0108461 | A | 9/2019 | | |
| KR | 20190105433 | A | 9/2019 | | |
| KR | 20190108461 | A | 9/2019 | | |
| WO | WO-2019172595 | A1 * | 9/2019 | ........... | H01F 27/366 |

OTHER PUBLICATIONS

Machine translation of CN111819761A (Oct. 23, 2020) (Year: 2020).*
Office Action for CN 202180073761.8 by China National Intellectual Property Administration dated May 28, 2025.
Office Action for KR 10-2020-0144122 by Korean Intellectual Property Office dated Nov. 27, 2024.
International Search Report for PCT/KR2021/015311 by Korean Intellectual Property Office dated Feb. 9, 2022.

* cited by examiner

100

Efficiency graph for normal charging (5V)

Comparative example 2

Embodiment

Comparative example 1

Output power (W)

Efficiency

300

WIRELESS POWER TRANSMITTING MODULE INCLUDING ACCOMMODATING PORTION AND AUXILIARY SHIELDING SHEET

CROSS-REFERENCE TO RELATED APPLICATIONS

This application is a National Phase Entry Application of PCT Application No. PCT/KR2021/015311 filed on Oct. 28, 2021, which claims priority to Korean Patent Application No. 10-2020-0144122 filed on Nov. 2, 2020, in Korean Intellectual Property Office, the entire contents of which are hereby incorporated by reference in its entirety.

TECHNICAL FIELD

The present invention relates to a wireless power transmitting module.

BACKGROUND ART

The wireless power transmission technology does not require a separate wired cable when charging, and thus is good for user convenience. Accordingly, the wireless power transmission technology is widely used as a method for charging a battery in various electronic devices.

Battery charging using such wireless power transmission is performed by receiving wireless power transmitted from a wireless power transmitting module through a wireless power receiving module.

Typically, the wireless power transmitting module includes an antenna unit for transmitting wireless power and a shielding sheet for shielding a magnetic field generated from the antenna unit to increase transmission efficiency, and a flat coil in which a conductive member is wound multiple times along one direction is used as the antenna unit.

Such wireless power transmitting module is not only implemented as a conventional wireless charger for transmitting wireless power using a commercial power source provided from a receptacle but, also embedded in a trackpad of a notebook computer or a portable auxiliary battery or the like.

When the wireless power transmitting module is embedded in a trackpad of a notebook computer or a portable auxiliary battery, the trackpad or the portable auxiliary battery in which the wireless power transmitting module is embedded generates a thickness issue unlike a conventional wireless charger.

In order to solve this problem, when the flat coil is used as the antenna unit, the shielding sheet includes an accommodating portion formed therethrough, and a leading wire for electrical connection extends from a coil body of the flat coil and is inserted into the accommodating portion formed in the shielding sheet.

However, in this case, since the thickness of the leading wire may be accommodated through the accommodating portion formed in the shielding sheet, the overall thickness of the wireless power transmitting module may be reduced, but a portion of the magnetic field generated from the flat coil leaks through the accommodating portion in which the leading wire is accommodated.

Particularly, when a metallic component such as a battery or a metallic housing is disposed below the wireless power transmitting module, the magnetic field leaked through the accommodating portion generates an eddy current due to the metallic material. Such an eddy current may reduce charging efficiency.

Accordingly, there is a need for a method capable of preventing from reducing charging efficiency due to leakage of a magnetic field while satisfying a required thickness.

DISCLOSURE

Technical Problem

The present invention is directed to providing a wireless power transmitting module capable of solving a leakage problem of a magnetic field while minimizing an increase in a total thickness.

Technical Solution

One aspect of the present invention provides a wireless power transmitting module, comprising: a coil unit provided as a flat coil including a coil body in which a conductive member having a predetermined length is wound in one direction, and a pair of terminal portions extending from the coil body by a predetermined length for electrical connection; a main shielding sheet disposed on one surface of the coil unit to shield a magnetic field generated from the coil unit; an accommodating portion formed through the main shielding sheet so as to accommodate the thickness of at least one of the pair of terminal portions; and an auxiliary shielding sheet attached to one surface of the main shielding sheet so as to cover the accommodating portion in order to shield a magnetic field leaking through the accommodating portion, wherein the auxiliary shielding sheet has a thinner thickness than the main shielding sheet.

In addition, the main shielding sheet may be provided to have a thickness of 7.5 times or more than the auxiliary shielding sheet.

In addition, the auxiliary shielding sheet may be a ribbon sheet of an amorphous alloy or a nanocrystalline grain alloy.

In addition, the auxiliary shielding sheet may be provided to have a smaller area than the main shielding sheet and to have an area completely covering the accommodating portion.

In addition, the wireless power transmitting module may be disposed on an upper portion of the battery such that the auxiliary shielding sheet is positioned between the main shielding sheet and the battery.

In addition, the main shielding sheet may include at least one of a ferrite sheet, a ribbon sheet of an amorphous alloy, and a ribbon sheet of a nanocrystalline grain alloy.

In addition, in the conductive member constituting the coil body, a plurality of wires may be grouped into one to form one turn, and the plurality of wires constituting one turn of the conductive member may be disposed in parallel along one surface of the main shielding sheet.

In addition, the coil unit may include a first coil for wirelessly charging a battery of a first electronic device; and a second coil for wirelessly charging a battery of a second electronic device, wherein the second coil may be provided to have a size smaller than that of the first coil, and be stacked on one surface of the first coil.

In addition, the first coil may be a flat coil formed of a coil body having a first width and having a hollow portion formed in a central portion, the second coil may be a flat coil formed of a coil body having a second width smaller than the first width and having a hollow portion formed in a central portion, and the second coil may be stacked on one surface of the first coil such that a portion corresponding to a portion of a width of the coil body is positioned in the hollow portion of the first coil.

In addition, one surface of the coil body of the first coil may be in direct contact with one surface of the main shielding sheet, and one surface of the coil body of the second coil may be spaced apart from one surface of the main shielding sheet by a thickness of the first coil.

In addition, the first coil may be a Qi standard A11 coil.

In addition, the first electronic device may be a mobile device and the second electronic device may be a smart watch.

Advantageous Effects

According to the present invention, the charging efficiency can be increased by solving the leakage problem of the magnetic field while minimizing the increase in the total thickness.

MODES OF THE INVENTION

Figure 1:
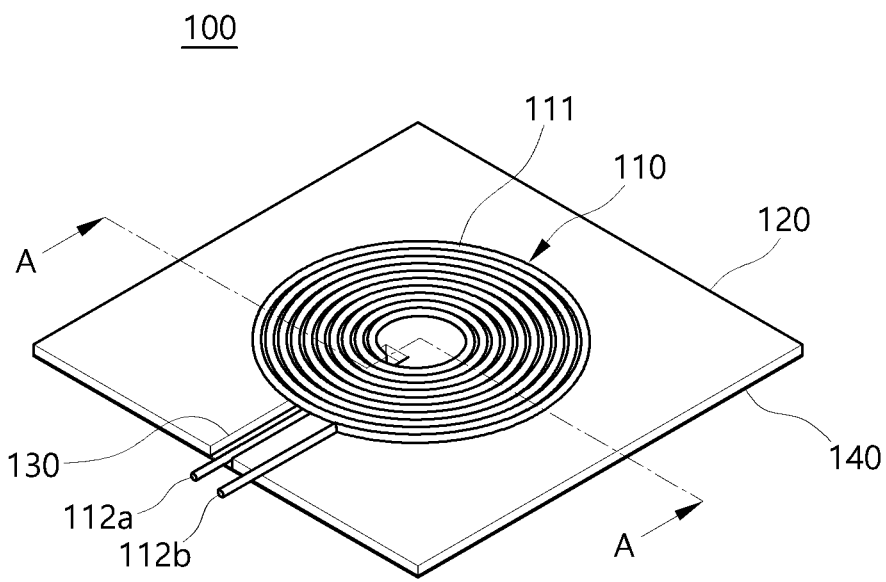
FIG. 1 is a diagram illustrating a wireless power transmitting module according to one exemplary embodiment of the present invention.

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention. Throughout the specification, like reference numerals denote like elements.

Figure 10:
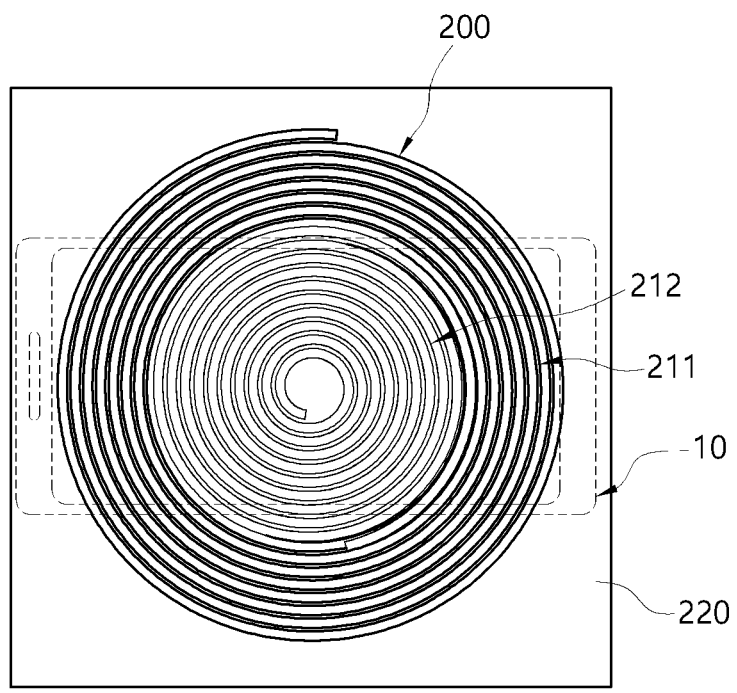
FIG. 10 is a use state diagram of charging a first electronic device using the wireless power transmitting module of FIG. 7.
Figure 11:
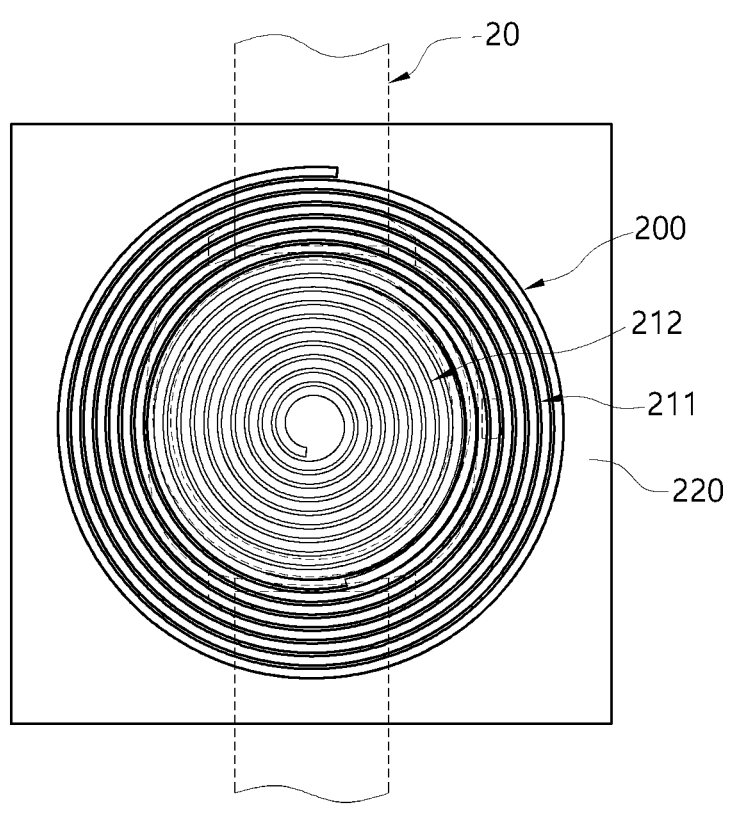
FIG. 11 is a use state diagram of charging a second electronic device using the wireless power transmitting module of FIG. 7.

As shown in FIGS. 10 and 11, the wireless power transmitting module 100, 100', 200 according to an embodiment of the present invention may transmit wireless power toward a wireless power receiving module when an electronic device 10, 20 which is a charging object in which the wireless power receiving module is embedded is disposed on the upper side thereof. Accordingly, a battery included in the electronic device 10, 20 may be wirelessly charged through interaction between the wireless power transmitting module 100, 100', 200 and the wireless power receiving module.

As shown in FIGS. 1 to 4 and 7 to 9, the wireless power transmitting module 100, 100'. 200 according to an embodiment of the present invention may include a coil unit 110, 210, a main shielding sheet 120, 220, an accommodating portion 130, 230, and an auxiliary shielding sheet 140, 140'.

When power is supplied, the coil unit 110, 210 may transmit wireless power using a predetermined frequency band. That is, the coil unit 110, 210 may serve as a wireless power transmitting antenna for transmitting wireless power.

Such a coil unit 110, 210 may be a flat coil including a coil body 111, 211a, 212a in which a conductive member having a predetermined length is wound a plurality of times along a clockwise direction or a counterclockwise direction, and a pair of terminal portions 112a, 112b, 211b, 211c, 212b, 212c extending a predetermined length from the coil body 111, 211a, 212a for electrical connection.

Herein, the pair of terminal portions 112a, 112b, 211b, 211c, 212b, 212c may include a first terminal portion 112a, 211b, 212b and a second terminal portion 112b, 211c, 212c extending from the coil body 111, 211a, 212a, respectively; the first terminal portion 112a, 211b, 212b may extend from an inner rim forming an empty space in the center portion of the coil body 111, 211a, 212a to cross the bottom surface of the coil body 111, 211a, 212a; and the second terminal portion 112b, 211c, 212c may extend from a predetermined length from an outer rim of the coil body 111, 211a, 212a.

In this case, the first terminal portion 112a, 211b, 212b may be inserted and disposed into the accommodating portion 130, 230 to be described later.

In this case, the conductive member forming the coil unit 110 may be a wire or a litz wire commonly used as shown in FIGS. 1 to 4. Alternatively, the conductive member B forming the coil unit 210 may be formed of a plurality of wires A having a predetermined line diameter, as shown in enlarged views of FIGS. 8 and 9, and the plurality of wires A may be insulated by a coating material having an insulating property on a surface thereof. In addition, in the conductive member B constituting the coil unit 210, a plurality of wires A may be grouped into one to form one turn of the coil body 211a, 212a.

Through this, in the wireless power transmitting module 200 according to an embodiment of the present invention, since one turn of the coil body 211a, 212a is formed through the conductive member B in which the plurality of wires A having a small line diameter are grouped, the resistance flowing in the coil itself may be reduced.

In addition, the plurality of wires A constituting one turn of the coil body 211a, 212a may be disposed parallel to one surface of the main shielding sheet 220.

Accordingly, in the wireless power transmitting module 200 according to an embodiment of the present invention, the thickness of the coil body 211*a*, 212*a* constituting the coil unit 210 may be the same as the thickness of the wire A constituting the conductive member B.

Through this, the wireless power transmitting module 200 according to an embodiment of the present invention may improve the problem of heating by reducing the resistance flowing in the coil itself, and thus may increase the charging efficiency, and since the thickness of the coil body 211*a*, 212*a* is the same as the thickness of the wire A, the overall thickness may be reduced, and thus it may be implemented in a thin form.

Figure 7:
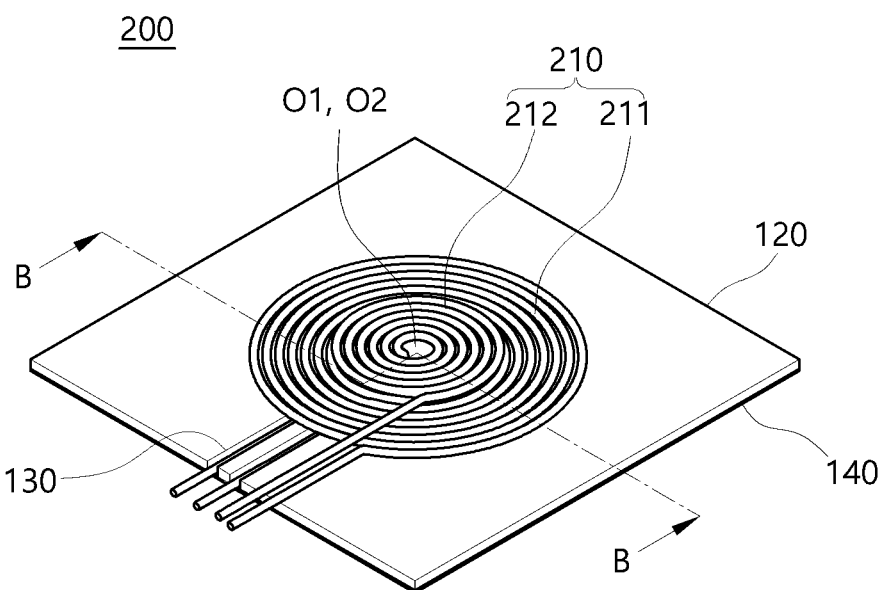
FIG. 7 is a diagram illustrating a wireless power transmitting module according to another embodiment of the present invention.
Figure 8:
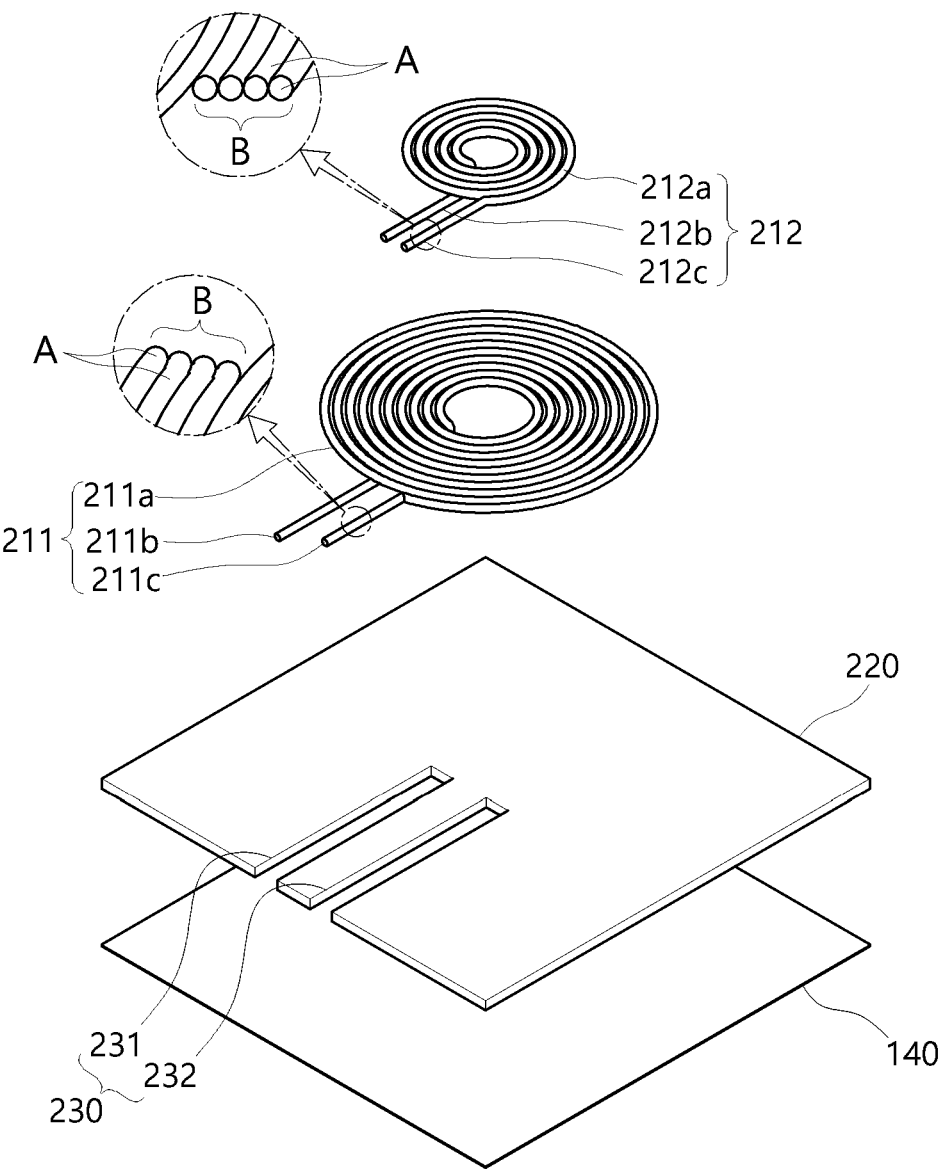
FIG. 8 is a separation diagram of FIG. 7.
Figure 9:
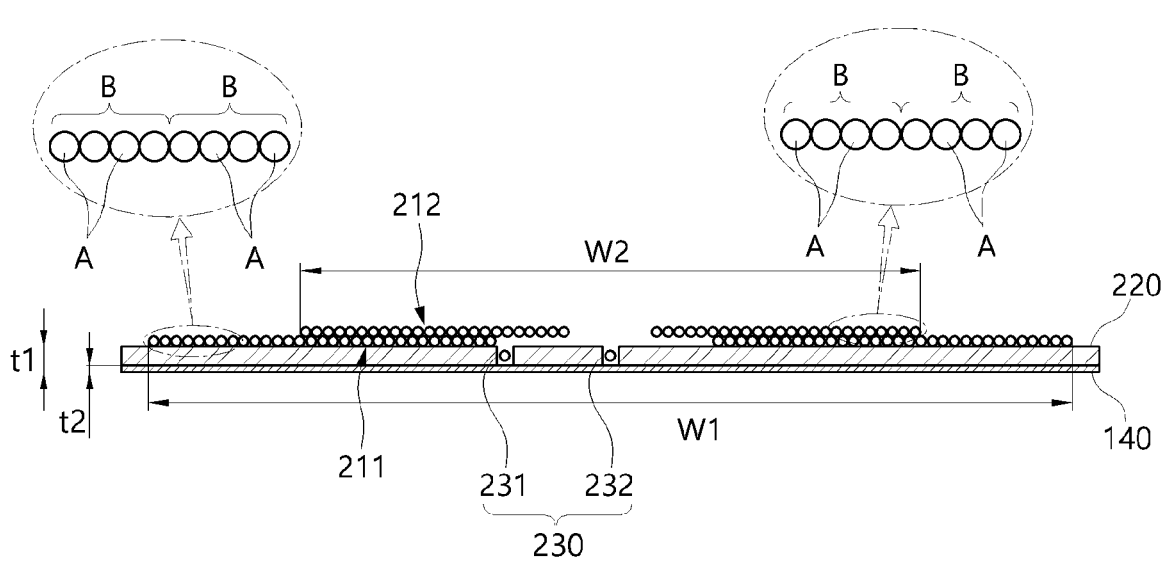
FIG. 9 is a cross-sectional view taken along the B-B direction of FIG. 7.

Although the coil units 210 shown in FIGS. 7 to 9 are formed through the conductive member B comprising the plurality of wires A, the present invention is not limited thereto, and the coil units 110 shown in FIGS. 1 to 4 may also be formed in the same manner as the coil units 210 shown in FIGS. 7 to 9.

Likewise, the coil units 110 shown in FIGS. 1 to 4 may replace the coil units 210 shown in FIGS. 7 to 8. Meanwhile, the coil unit 210 may be formed of a plurality of coils 211, 212 having different sizes so as to charge all batteries of heterogeneous electronic devices having different sizes.

Herein, the heterogeneous electronic devices having different sizes may be electronic devices having different sizes and types such as a wearable device or a mobile device, or may be electronic devices having different sizes of receiving antennas of a wireless power receiving module embedded in each electronic device.

In addition, the heterogeneous electronic devices may include electronic devices having different sizes of receiving antennas of a wireless power receiving module embedded in each electronic device even though they are the same types of electronic devices.

Further, in any one of the heterogeneous electronic devices, the receiving antenna constituting the wireless power receiving module may be an antenna of the Qi standard A11. For example, any one electronic device 10 of the heterogeneous electronic devices 10 and 20 may be a first electronic device 10 that receives wireless power through a receiving antenna of the Qi standard A11 as shown in FIG. 10, and the other electronic device 20 may be a second electronic device 20 that receives wireless power through a receiving antenna having a size smaller than that of the receiving antenna of the Qi standard A11 as shown in FIG. 11.

As a non-limiting example, the first electronic device 10 may be a mobile electronic device in which a receiving antenna of the Qi standard A11 is embedded, such as a smartphone, and the second electronic device 20 may be a wearable device in which a receiving antenna having a size smaller than that of the receiving antenna of the Qi standard A11 is embedded, such as a smart watch.

As a specific example, the coil unit 210 may include a first coil 211 for wirelessly charging a battery of the first electronic device 10 and a second coil 212 for wirelessly charging a battery of the second electronic device 20, and the second coil 212 may be provided to have a size smaller than that of the first coil 211, and may be stacked on one surface of the first coil 211.

That is, the first coil 211 may serve as an antenna for charging the battery of the first electronic device 10, and the second coil 212 may serve as an antenna for charging the battery of the second electronic device 20.

In this case, as shown in FIG. 9, the coil body 211*a* of the first coil 211 may have a size of a first width W1, and the coil body 212*a* of the second coil 212 may have a second width W2 narrower than that of the first width W1.

Accordingly, one surface of the first coil 211 may be in direct contact with one surface of the main shielding sheet 220, and one surface of the second coil 212 may be spaced apart from one surface of the main shielding sheet 220 by a thickness of the first coil 211.

In this case, the second coil 212 may be stacked on one surface of the first coil 211 such that a portion corresponding to a width of a portion including a hollow portion of the coil body 212*a* is positioned in a hollow portion of the first coil 211.

That is, a portion corresponding to a width of a portion including the hollow portion of the entire width of the coil body 212*a* in the second coil 212 may be positioned in the hollow portion of the first coil 211 such that one surface thereof may face one surface of the main shielding sheet 220, and a portion corresponding to a remaining width of the coil body 212*a* in the second coil 212 except for a portion positioned in the hollow portion of the first coil 211 may overlap the coil body 212*a* of the first coil 211.

In this case, as shown in FIG. 7, the second coil 212 may be stacked on one surface of the first coil 211 such that a central point O2 of the coil body 212*a* coincides with a central point O1 of the coil body 211*a* constituting the first coil 211.

In addition, the first coil 211 and the second coil 212 may be connected in parallel with a circuit unit (for example, a circuit board) for controlling overall driving, and any one of the first coil 211 and the second coil 212 may be selectively operated through control of the circuit unit.

Through this, in the wireless power transmitting module 200 according to an embodiment of the present invention, the coil unit 210 for charging the batteries of different heterogeneous electronic devices may include a first coil 211 having a size of the Qi standard A11 and a second coil 212 having a size smaller than the size of the Qi standard A11, the second coil 212 may be disposed on one surface of the first coil 211 so as to overlap only a portion corresponding to a partial width of the entire width of the first coil 211, and the first coil 211 and the second coil 212 may be disposed so that the central points O1 and O2 coincide with each other.

Accordingly, since the wireless power transmitting module 200 according to an embodiment of the present invention may selectively perform wireless charging using the first coil 211 and the second coil 212, all batteries of different heterogeneous electronic devices may be charged while solving authentication problems for the coils of the Qi standard A11.

Further, since the central points O1 and O2 of the first coil 211 and the second coil 212 are disposed to coincide with each other in the wireless power transmitting module 200 according to an embodiment of the present invention, even though the first electronic device 10 and the second electronic device 20 of different heterogeneities are disposed at the same position, the wireless power receiving antenna included in the first electronic device 10 and the wireless power receiving antenna included in the second electronic device 20 which are different heterogeneous electronic devices may be disposed in an alignment state in which the central points coincide with any one coil of the first coil 211 and the second coil 212.

Through this, the wireless power transmitting module 200 according to an embodiment of the present invention may satisfy wireless charging efficiency of each of the first electronic device 10 and the second electronic device 20 which are different heterogeneous electronic devices.

Accordingly, when the wireless power transmitting module 200 according to an embodiment of the present invention is used, the heterogeneous electronic devices 10 and 20 may charge their own battery using wireless power transmitted through the first coil 211 or the second coil 212 even without using a dedicated charger.

In addition, when the wireless power transmitting module 200 according to an embodiment of the present invention is used, the electronic devices 10 and 20 may be always disposed at the same position regardless of the type of the electronic devices 10 and 20, and thus convenience of use may be improved.

The main shielding sheet 120, 220 may shield the magnetic field generated in the coil unit 110, 210 and may focus the magnetic field in the required direction.

Through this, the main shielding sheet 120, 220 may increase the performance of the coil unit 110, 210 operating in a predetermined frequency band.

To this end, the main shielding sheet 120, 220 may be disposed on one surface of the coil unit 110, 210, and may be made of a material having magnetic properties so as to shield a magnetic field.

For example, as the main shielding sheet 120, 220, an amorphous ribbon sheet, a ferrite sheet, a polymer sheet, or the like may be used. Herein, the amorphous ribbon sheet may be a ribbon sheet of an amorphous alloy or a ribbon sheet of a nanocrystalline grain alloy, and the ferrite sheet may be a sintered ferrite sheet such as Mn—Zn ferrite or Ni—Zn ferrite.

In addition, the main shielding sheet 120, 220 may be a sheet separated into a plurality of pieces so as to improve flexibility or suppress generation of an eddy current by increasing overall resistance, and the main shielding sheet 120, 220 may be a multilayer sheet in which a plurality of magnetic sheets are stacked in multiple layers by a medium of an adhesive layer.

In addition, the main shielding sheet 120, 220 may be a hybrid sheet in which different types of magnetic sheets are stacked.

However, the material of the main shielding sheet 120, 220 is not limited thereto, and any known material used as a shielding sheet for increasing wireless power transmission efficiency may be used as the material of the main shielding sheet 120, 220.

In this case, the main shielding sheet 120, 220 may include at least one accommodating portion 130, 230 formed therethrough so as to accommodate a thickness of at least one of the pair of terminal portions 112a, 112b, 211b, 211c, 212b, 212c.

That is, the accommodating portion 130, 230 may be formed to be introduced into the inside from the edge of the main shielding sheet 120, 220 by a predetermined length, and may be formed to penetrate the entire thickness of the main shielding sheet 120, 220.

Accordingly, the terminal portion 112a, 211b, 212b extending across the bottom surface of the coil body 111, 211a, 212a of the pair of terminal portions 112a, 112b, 211b, 211c, 212c may be inserted and disposed into the accommodating portion 130, 230.

Through this, since the thickness of the terminal portion 112a, 211b, 212b extending across the bottom surface of the coil body 111, 211a, 212a of the pair of terminal portions 112a, 112b, 211b, 211c, 212c may be accommodated through the accommodating portion 130, 230, the overall thickness of the coil unit 110, 210 may be prevented from increasing by the terminal portion 112a, 211b, 212b extending across the bottom surface of the coil body 111, 211a, 212a.

Herein, the accommodating portion 130, 230 may be provided in an appropriate number according to the coil unit 110, 210.

For example, as shown in FIGS. 1 to 4, when the coil unit 110 is composed of one flat coil, the accommodating portion 130 may be provided as one, and as shown in FIGS. 7 to 9, when the coil unit 210 includes a first coil 211 and a second coil 212, the accommodating portion 230 may include a first accommodating portion 231 for accommodating a terminal portion 211b of the first coil 211 and a second accommodating portion 232 for accommodating a terminal portion 212b of the second coil 212.

However, the number of the accommodating portion 130, 230 to be formed is not limited thereto, and the accommodating portion 130, 230 may be provided as one regardless of the number of flat coils constituting the coil unit 110, 210. That is, the first accommodating portion 231 and the second accommodating portion 232 may be integrated as one.

The auxiliary shielding sheet 140, 140' may be a plate-shaped sheet having a predetermined area, and may be attached to one surface of the main shielding sheet 120, 220.

In this case, the auxiliary shielding sheet 140, 140' may be attached to one surface of the main shielding sheet 120, 220 so as to cover the accommodating portion 130, 230 formed through the main shielding sheet 120, 220.

Such an auxiliary shielding sheet 140, 140' may be made of a material having magnetic properties, similar to the main shielding sheet 120, 220.

Through this, even though the main shielding sheet 120, 220 includes the accommodating portion 130, 230 for accommodating the thicknesses of the terminal portion 112a, 211b, 212b in the wireless power transmitting module 100, 100', 200 according to an embodiment of the present invention, the auxiliary shielding sheet 140, 140' is attached to one surface of the main shielding sheet 120, 220 so as to cover the accommodating portion 130, 230, and thus part of the magnetic field generated in the coil unit 110, 210 may be blocked from leaking to the outside through the accommodating portion 130, 230.

Accordingly, the wireless power transmitting module 100, 100', 200 according to an embodiment of the present invention may prevent a reduction in charging efficiency due to leakage of the magnetic field through the accommodating portion 130, 230.

In particular, when the wireless power transmitting module 100, 100', 200 according to an embodiment of the present invention is disposed on an upper portion of a component formed of a metal material such as a battery 330 (see FIG. 12), the wireless power transmitting module 100, 100'. 200 may be disposed on an upper portion of the battery 330 so that the auxiliary shielding sheet 140, 140' is positioned between the main shielding sheet 120, 220 and the battery 330.

Through this, the wireless power transmitting module 100, 100', 200 according to an embodiment of the present invention may fundamentally block leakage of the magnetic field toward the accommodating portion 130, 230 by the auxiliary shielding sheet 140, 140', and thus may fundamentally prevent generation of an eddy current due to the metal material.

Accordingly, the wireless power transmitting module 100, 100', 200 according to an embodiment of the present invention may prevent a reduction in charging efficiency due to an eddy current generated by the metal material.

In this case, the auxiliary shielding sheet 140, 140' may be provided to have a thickness that is very smaller than that of the main shielding sheet 120, 220.

For example, the main shielding sheet 120, 220 may be provided to have a thickness that is 7.5 times or more than that of the auxiliary shielding sheets 140, 140'. As a specific example, the thickness t1 of the main shielding sheet 120, 220 may be 0.15 to 0.2 mm, and the thickness t2 of the auxiliary shielding sheet 140, 140' may be 0.015 to 0.02 mm.

That is, the main shielding sheet 120, 220 may have a thickness capable of sufficiently shielding a magnetic field generated from the coil unit 110, 210, and the auxiliary shielding sheet 140, 140' may be provided to have a thickness that is very smaller than that of the main shielding sheet 120, 220 and capable of shielding a portion of a magnetic field introduced into the accommodating portion 130, 230 among the entire magnetic field generated from the coil unit 110, 210.

Through this, even though the wireless power transmitting module 100, 100', 200 according to an embodiment of the present invention includes the auxiliary shielding sheet 140, 140' attached to one surface of the main shielding sheet 120, 220, a problem in that a magnetic field leaks into the accommodating portion 130, 230 may be solved while minimizing an increase in a total thickness by the auxiliary shielding sheet 140, 140'.

Accordingly, since the wireless power transmitting module 100, 100', 200 according to an embodiment of the present invention may solve a problem in that a magnetic field leaks while minimizing an increase in a total thickness, charging efficiency may be improved.

Figure 5:
FIG. 5 is a graph illustrating a charging efficiency at 5V using a wireless power transmitting module according to one exemplary embodiment of the present invention and a charging efficiency at 5V using a conventional wireless power transmitting module.
Figure 6:
FIG. 6 is a graph illustrating a charging efficiency at 9V using a wireless power transmitting module according to one exemplary embodiment of the present invention and a charging efficiency at 9V using a conventional wireless power transmitting module.

This may be confirmed from the graphs of FIGS. 5 and 6.

That is, in FIGS. 5 and 6, Comparative Example 1 is a charging efficiency at a normally required reference voltage, Comparative Example 2 is a charging efficiency in a conventional wireless power transmitting module in which an accommodating portion is formed in a shielding sheet, and Embodiment is a charging efficiency using the wireless power transmitting module 100, 100' shown in FIGS. 1 to 4.

Herein, Comparative Example 2 and Embodiment are result values obtained by measuring charging efficiency in a state in which the wireless power transmitting module is disposed on an upper portion of a battery including an exterior material made of a metal material.

As can be confirmed from FIGS. 5 and 6, even though the wireless power transmitting module 100, 100' according to an embodiment of the present invention is disposed on an upper portion of a battery including an exterior material made of a metal material, the wireless power transmitting module 100, 100' according to an embodiment of the present invention may realize charging efficiency equal to or higher than charging efficiency at a reference voltage even during a normal charging in which a 5V voltage is applied and a high-speed charging in which a 9V voltage is applied as well.

Figure 2:
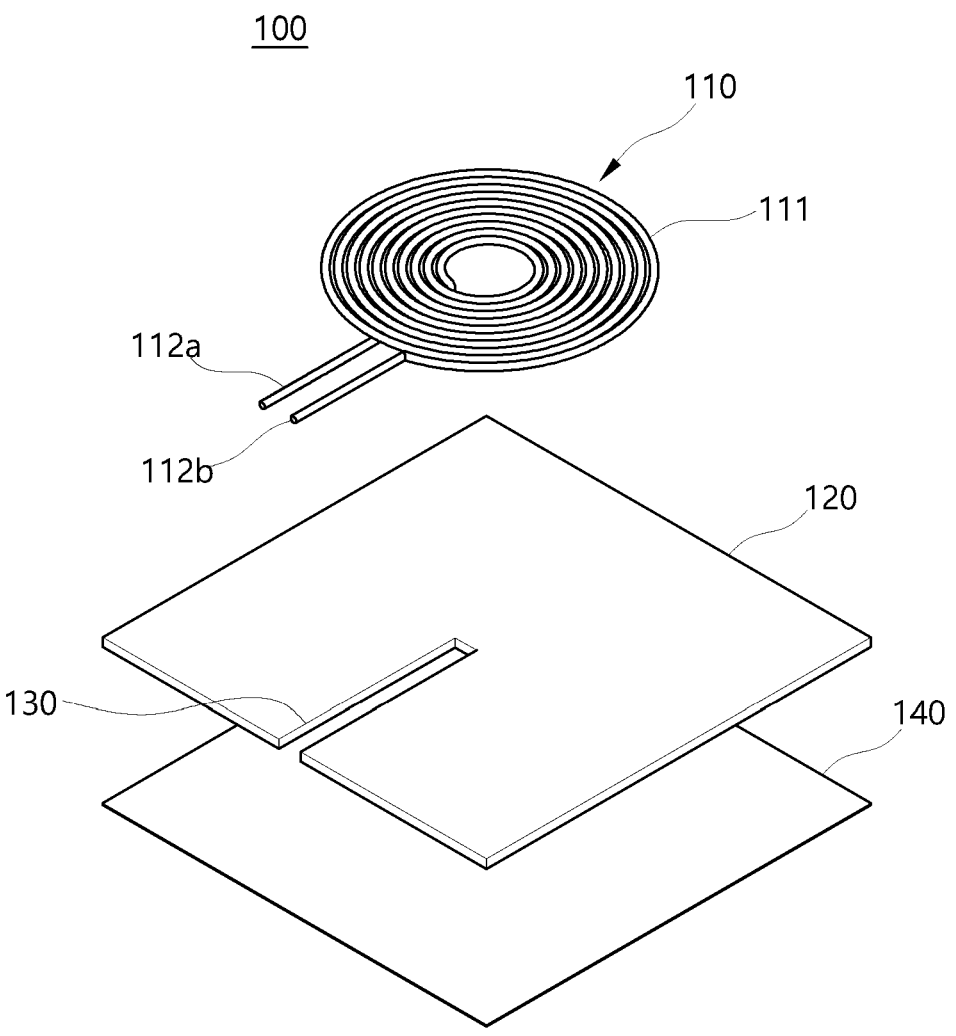
FIG. 2 is a separation diagram of FIG. 1.
Figure 4:
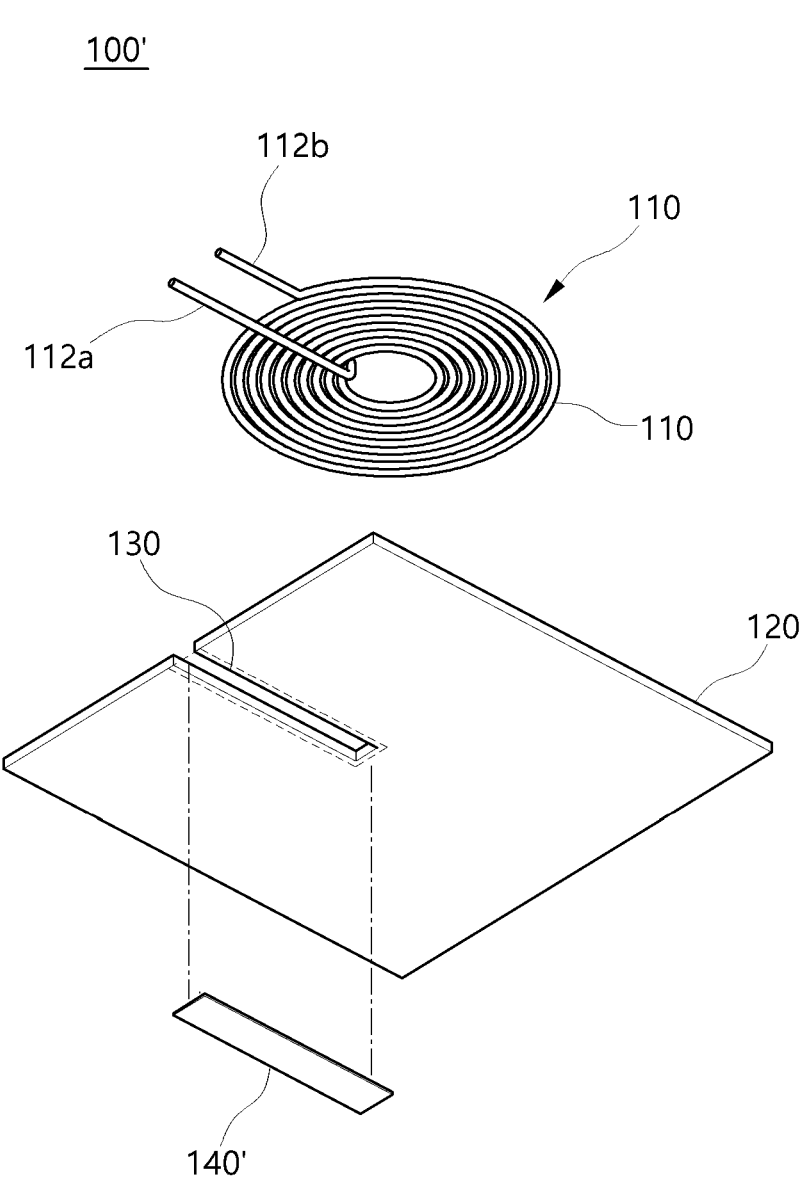
FIG. 4 is a diagram illustrating a modification example of FIG. 1.

In this case, the auxiliary shielding sheet 140, 140' may be provided to have an area that is approximately the same as that of the main shielding sheet 120, 220 as shown in FIGS. 2 and 8, but may be provided to have an area that is smaller than that of the main shielding sheet 120, 220 and completely covers the accommodating portion 130, 230 as shown in FIG. 4.

In addition, the auxiliary shielding sheet 140, 140' may be formed of a ribbon sheet of an amorphous alloy or a ribbon sheet of a nanocrystalline grain alloy so as to achieve sufficient shielding performance even at a very thin thickness, although all materials commonly used as a shielding sheet such as a ferrite sheet, a polymer, and the like may be used as the main shielding sheet 120, 220.

Meanwhile, the above-described wireless power transmitting module 100, 100', 200 may be implemented as a separate wireless charger.

Figure 12:
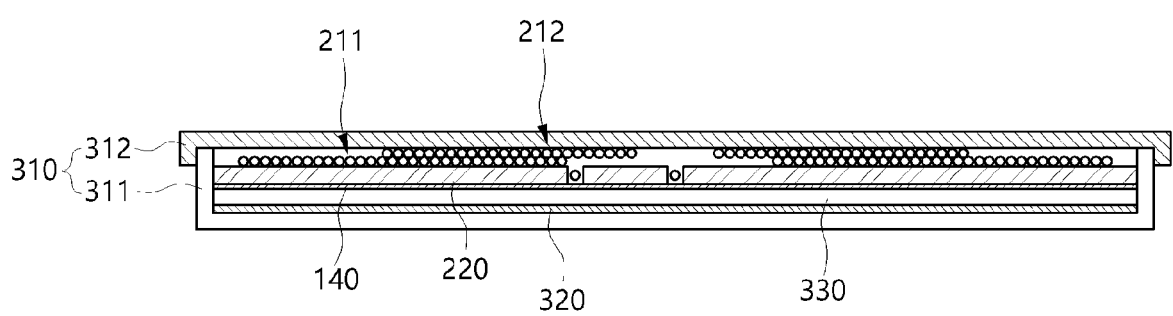
FIG. 12 is a cross-sectional coupling diagram illustrating a case where a wireless power transmitting module according to one exemplary embodiment of the present invention is implemented as an auxiliary battery.

For example, as shown in FIG. 12, the above-described wireless power transmitting module 200 may be implemented as a portable auxiliary battery 300 together with a case 310, a battery 330, and a circuit unit 320.

That is, the auxiliary battery 300 may be implemented in a form in which the above-described wireless power transmitting module 200, the battery 330, and the circuit unit 320 are embedded in the case 310.

Herein, the case 310 may be formed in an enclosure shape having an inner space, and the case 310 may include a first case 311 with an open upper portion and a second case 312 covering the open upper portion of the first case 311.

In addition, one surface exposed to the outside in the second case 312 may be formed as a horizontal surface, and the horizontal surface may be a seating surface on which the first electronic device 10 and/or the second electronic device 20, which are charging objects, are placed. In addition, the circuit unit 320 may control overall operation, and may have an MCU mounted on one surface of a circuit board thereof.

In this case, the circuit unit 320, the battery 330, and the wireless power transmitting module 200 may be sequentially stacked from the bottom surface of the first case 311 in the case 310.

Through this, the wireless power transmitting module 200 according to an embodiment of the present invention may be implemented as a portable auxiliary battery 300 capable of charging batteries of different heterogeneous electronic devices 10 and 20, respectively.

Although the portable auxiliary battery 300 illustrated in FIG. 12 is illustrated as including the wireless power transmitting module 200 illustrated in FIGS. 7 to 9, the present invention is not limited thereto, and the wireless power transmitting module 200 illustrated in FIG. 12 may be replaced with the wireless power transmitting module 100, 100' illustrated in FIGS. 1 to 4.

Figure 13:
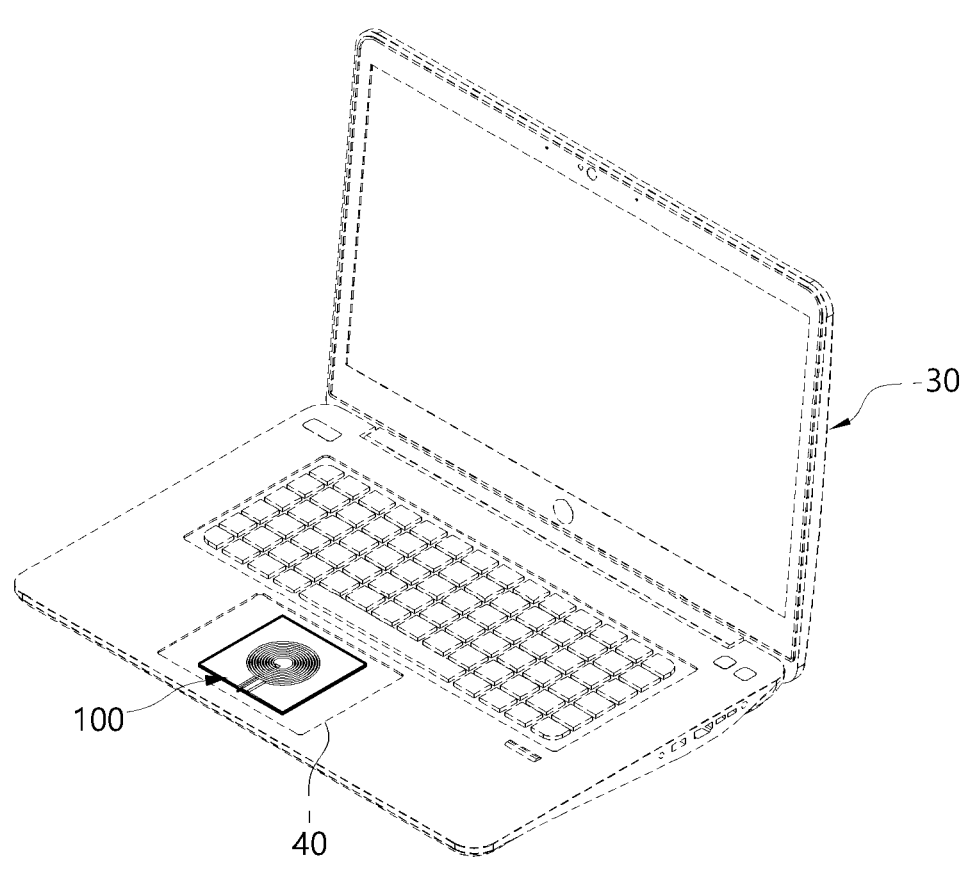
FIG. 13 is a diagram illustrating a case where a wireless power transmitting module according to one exemplary embodiment of the present invention is applied to a trackpad of a notebook computer.

As another example, the wireless power transmitting module 100 may be embedded in a known trackpad 40. For example, the trackpad 40 may be a trackpad provided in a notebook computer 30 as shown in FIG. 13.

In this case, the wireless power transmitting module 100 may be embedded to be positioned at a lower side of the trackpad 40.

Figure 3:
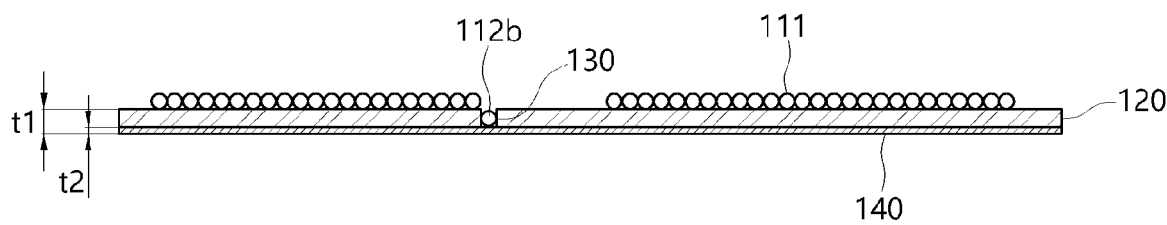
FIG. 3 is a cross-sectional view taken along the A-A direction of FIG. 1.

Although the wireless power transmitting module 100 illustrated in FIGS. 1 to 3 is illustrated as the wireless power transmitting module applied to the trackpad in the drawing, the present invention is not limited thereto, and the wireless power transmitting module 100', 200 illustrated in FIGS. 4 and 7 to 9 may also be equally applied to the trackpad. In this case, when the first electronic device 10 or the second electronic device 20 is placed on the trackpad 40, any one of the first coil 211 and the second coil 212 may be selectively operated as described above, and the battery of the first electronic device 10 or the second electronic device 20 may be charged through the selectively operated first coil 211 or the second coil 212.

However, the application target of the wireless power transmitting module 100, 100'. 200 according to an embodiment of the present invention is not limited thereto, and may be applied to all of various electronic devices for implementing a wireless charging function.

Although exemplary embodiments of the present invention have been described above, the idea of the present invention is not limited to the embodiments set forth herein. Those of ordinary skill in the art who understand the idea of the present invention may easily propose other embodiments through supplement, change, removal, addition, etc. of elements within the scope of the same idea, but the embodiments will be also within the idea scope of the present invention.

The invention claimed is:

1. A wireless power transmitting module, comprising:
a coil unit provided as a flat coil including a coil body in which a conductive member having a predetermined length is wound in one direction, and a pair of terminal portions extending from the coil body by a predetermined length for electrical connection;
a main shielding sheet disposed on one surface of the coil unit to shield a magnetic field generated from the coil unit;
an accommodating portion formed through the main shielding sheet so as to accommodate the thickness of at least one of the pair of terminal portions; and
an auxiliary shielding sheet attached to one surface of the main shielding sheet so as to cover the accommodating portion in order to shield a magnetic field leaking through the accommodating portion,
wherein the auxiliary shielding sheet has a thinner thickness than the main shielding sheet,
wherein the coil unit comprises a first coil for wirelessly charging a battery of a first electronic device and a second coil for wirelessly charging a battery of a second electronic device, the second coil being provided to have a size smaller than that of the first coil and being stacked on one surface of the first coil, and
wherein the accommodating portion comprises a first accommodating portion for accommodating one of the pair of terminal portions of the first coil and a second accommodating portion for accommodating one of the pair of terminal portions of the second coil.

2. The wireless power transmitting module of claim 1, wherein the main shielding sheet is provided to have a thickness of 7.5 times or more than the auxiliary shielding sheet.

3. The wireless power transmitting module of claim 1, wherein the auxiliary shielding sheet is a ribbon sheet of an amorphous alloy or a nanocrystalline grain alloy.

4. The wireless power transmitting module of claim 1, wherein the auxiliary shielding sheet is provided to have a smaller area than the main shielding sheet and to have an area completely covering the accommodating portion.

5. The wireless power transmitting module of claim 1, wherein the wireless power transmitting module is disposed on an upper portion of a battery such that the auxiliary shielding sheet is positioned between the main shielding sheet and the battery.

6. The wireless power transmitting module of claim 1, wherein the main shielding sheet comprises at least one of a ferrite sheet, a ribbon sheet of an amorphous alloy, and a ribbon sheet of a nanocrystalline grain alloy.

7. The wireless power transmitting module of claim 1, wherein in the conductive member constituting the coil body, a plurality of wires are grouped into one to form one turn, and the plurality of wires constituting one turn of the conductive member are disposed in parallel along one surface of the main shielding sheet.

8. The wireless power transmitting module of claim 1, wherein:
the first coil is a flat coil formed of a coil body having a first width and having a hollow portion formed in a central portion,
the second coil is a flat coil formed of a coil body having a second width smaller than the first width and having a hollow portion formed in a central portion, and
the second coil is stacked on one surface of the first coil such that a portion corresponding to a portion of a width of the coil body is positioned in the hollow portion of the first coil.

9. The wireless power transmitting module of claim 1, wherein:
one surface of the coil body of the first coil is in direct contact with one surface of the main shielding sheet, and
one surface of the coil body of the second coil is spaced apart from one surface of the main shielding sheet by a thickness of the first coil.

10. The wireless power transmitting module of claim 1, wherein the first coil is a Qi standard A11 coil.

* * * * *